US011255252B2

(12) United States Patent
Bogner et al.

(10) Patent No.: US 11,255,252 B2
(45) Date of Patent: Feb. 22, 2022

(54) RADIAL COMPRESSOR FOR A CHARGING DEVICE OF AN INTERNAL COMBUSTION ENGINE, CHARGING DEVICE AND LAMELLAS FOR AN IRIS DIAPHRAGM MECHANISM, AND METHOD FOR PRODUCING SUCH LAMELLA

(71) Applicant: Vitesco Technologies GMBH, Hannover (DE)

(72) Inventors: Mathias Bogner, Straubing (DE); Christoph Schäfer, Coburg (DE); Sasa Slavic, Heidelberg (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 16/818,194

(22) Filed: Mar. 13, 2020

(65) Prior Publication Data
US 2020/0217241 A1 Jul. 9, 2020

Related U.S. Application Data

(63) Continuation of application No. PCT/EP2018/070143, filed on Jul. 25, 2018.

(51) Int. Cl.
*F02B 33/40* (2006.01)
*F02B 39/16* (2006.01)
(Continued)

(52) U.S. Cl.
CPC .............. *F02B 33/40* (2013.01); *F02B 39/16* (2013.01); *F04D 17/10* (2013.01);
(Continued)

(58) Field of Classification Search
CPC .......... F02B 33/40; F02B 39/16; F04D 17/10; F04D 29/4213; F04D 29/464;
(Continued)

(56) References Cited

U.S. PATENT DOCUMENTS

| 2,037,663 | A | * | 4/1936 | Lalor | ........................ F16K 3/03 251/212 |
| 2,117,944 | A | * | 5/1938 | Cochrane | ................ F23D 14/64 251/212 |

(Continued)

FOREIGN PATENT DOCUMENTS

| CN | 105605238 A | * | 5/2016 | ............... F16K 3/03 |
| CN | 10700270 | | 8/2016 | |

(Continued)

OTHER PUBLICATIONS

International Search Report and Written Opinion dated 2018 Oct. 2018 from corresponding International Patent Application No. PCT/EP2018/070143.

(Continued)

*Primary Examiner* — Thai Ba Trieu

(57) ABSTRACT

A radial compressor has an iris diaphragm mechanism for a pressure-charging device of an internal combustion engine. The radial compressor has a bearing assembly, in which a rotor shaft is rotatably mounted, having a compressor impeller arranged in a compressor housing for conjoint rotation on the rotor shaft and having a fresh air supply channel for carrying a fresh air mass flow to the compressor impeller. The iris diaphragm mechanism is upstream of the compressor impeller, allowing variable adjustment of a flow cross section for the fresh air mass flow for admission to the compressor impeller, at least over a partial region. For this purpose, the iris diaphragm mechanism has multiple lamellae which each have a plate style lamella main body and a pin style actuating element as integral constituent parts of the respective lamella.

15 Claims, 10 Drawing Sheets

(51) Int. Cl.
*F04D 17/10* (2006.01)
*F04D 29/42* (2006.01)
*F04D 29/46* (2006.01)
*F04D 27/02* (2006.01)

(52) U.S. Cl.
CPC ....... *F04D 29/4213* (2013.01); *F04D 29/464* (2013.01); *F04D 27/0253* (2013.01); *F05B 2250/02* (2013.01); *F05B 2250/501* (2013.01)

(58) Field of Classification Search
CPC .............. F04D 29/324; F04D 27/0253; F05B 2250/02; F05B 2250/501; F01D 5/02; F01D 1/34; F01D 5/28; F16K 3/03
USPC ...... 415/151; 29/889, 889.21, 889.23, 889.7, 29/889.71; 251/212
See application file for complete search history.

(56) References Cited

U.S. PATENT DOCUMENTS

| | | | | |
|---|---|---|---|---|
| 2,321,336 | A * | 6/1943 | Tondreau | F16K 3/03 251/212 |
| 2,649,272 | A * | 8/1953 | Barbato | F16K 3/03 251/212 |
| 4,094,492 | A * | 6/1978 | Beeman | F16K 3/03 251/212 |
| 7,870,670 | B2 * | 1/2011 | Oehring | B32B 15/01 29/889.7 |
| 8,172,536 | B2 * | 5/2012 | Kombowski | F16H 41/28 416/192 |
| 8,316,820 | B1 | 11/2012 | Cammarata | |
| 8,910,920 | B1 * | 12/2014 | Daniels | F16K 3/03 251/212 |
| 10,295,100 | B1 * | 5/2019 | Handley | F16K 3/03 |
| 2006/0261303 | A1 * | 11/2006 | Thomas | F16K 3/03 251/212 |
| 2008/0192326 | A1 * | 8/2008 | Mizumaki | G03B 9/06 359/234 |
| 2009/0065081 | A1 | 3/2009 | Luebbers | |
| 2009/0095350 | A1 | 4/2009 | Bauman et al. | |
| 2014/0308110 | A1 | 10/2014 | Houst et al. | |
| 2015/0041695 | A1 * | 2/2015 | Daniels | F16K 3/03 251/212 |
| 2016/0177956 | A1 | 6/2016 | Mohtar et al. | |
| 2016/0265386 | A1 | 9/2016 | Annati et al. | |
| 2016/0265424 | A1 | 9/2016 | Tingaud et al. | |
| 2017/0191496 | A1 | 7/2017 | Bamba et al. | |
| 2017/0211707 | A1 * | 7/2017 | Wakayama | F16K 3/03 |
| 2017/0320470 | A1 * | 11/2017 | Belanger | F16K 3/03 |
| 2018/0045107 | A1 | 2/2018 | Hani et al. | |
| 2018/0202559 | A1 * | 7/2018 | Freeman, III | F16K 3/03 |
| 2018/0258842 | A1 * | 9/2018 | Villemin | F16K 3/03 |
| 2019/0178151 | A1 * | 6/2019 | Smith | F04D 29/464 |
| 2020/0208568 | A1 * | 7/2020 | Bogner | F04D 29/464 |
| 2020/0208570 | A1 * | 7/2020 | Bogner | F04D 29/464 |
| 2020/0208650 | A1 * | 7/2020 | Bogner | F04D 29/4213 |
| 2020/0208651 | A1 * | 7/2020 | Bogner | F04D 29/4213 |
| 2021/0048038 | A1 * | 2/2021 | Bogner | F04D 29/464 |

FOREIGN PATENT DOCUMENTS

| | | | |
|---|---|---|---|
| CN | 105863826 A | 8/2016 | |
| CN | 205422846 U | 8/2016 | |
| DE | 2812776 A1 * | 9/1979 | ............... B63H 1/14 |
| DE | 102006029370 A1 | 1/2008 | |
| DE | 102010017881 A1 * | 10/2011 | ............... F16K 3/03 |
| DE | 102011121996 A1 | 6/2013 | |
| DE | 102012011423 B3 | 11/2013 | |
| DE | 102018006963 A1 * | 3/2020 | ............... F16K 3/03 |
| EP | 3236077 A1 | 10/2017 | |
| JP | 60227066 A * | 11/1985 | ............... F16K 3/03 |
| JP | 2009236035 A * | 10/2009 | ............. F04D 29/46 |
| KR | 1173307 B1 * | 8/2012 | ............... F16K 3/03 |
| WO | 9728390 A1 | 8/1997 | |
| WO | 2016041024 A2 | 3/2016 | |
| WO | 2018106620 A1 | 6/2018 | |

OTHER PUBLICATIONS

Chinese Office Action dated Mar. 3, 2021 for corresponding Chinese Patent Application No. 201880059787.5.
German Search Report dated Sep. 14, 2017 for corresponding German Patent Application No. 10 2017 216 311.9.

\* cited by examiner

RADIAL COMPRESSOR FOR A CHARGING DEVICE OF AN INTERNAL COMBUSTION ENGINE, CHARGING DEVICE AND LAMELLAS FOR AN IRIS DIAPHRAGM MECHANISM, AND METHOD FOR PRODUCING SUCH LAMELLA

CROSS-REFERENCE TO RELATED APPLICATIONS

This application claims the benefit of PCT Application PCT/EP2018/070143, filed Jul. 25, 2018, which claims priority to German Application DE 10 2017 216 311.9 filed Sep. 14, 2017. The disclosures of the above applications are incorporated herein by reference.

TECHNICAL FIELD

A radial compressor for a supercharging device, in particular for the supercharging of an internal combustion engine with air at elevated pressure is provided. Furthermore, a supercharging device having a radial compressor of the type, and a lamella for an iris diaphragm mechanism of the radial compressor, and a method for producing a lamella of the type is provided.

BACKGROUND

Supercharging devices which have a radial compressor, in particular exhaust-gas turbochargers, are increasingly being used to increase power in motor vehicle internal combustion engines. More and more frequently, this is done with the aim of reducing the overall size and weight of the internal combustion engine for the same power or even increased power and, at the same time, of reducing consumption and thus CO2 emissions, with regard to ever stricter legal requirements in this respect.

Here, the operating principle of an exhaust-gas turbocharger consists in utilizing the energy contained in the exhaust-gas flow to increase the pressure in an intake tract of the internal combustion engine by means of a radial compressor and thus effect improved charging of a combustion chamber of the internal combustion engine with atmospheric oxygen. In this way, more fuel, such as gasoline or diesel, can be converted in each combustion process, that is to say the power of the internal combustion engine can be increased.

To this end, the exhaust-gas turbocharger has an exhaust-gas turbine arranged in the exhaust tract of the internal combustion engine, a radial compressor arranged in the intake tract, and a rotor bearing arranged in between. The exhaust-gas turbine has a turbine housing and, arranged therein, a turbine impeller which is driven by the exhaust-gas mass flow. The radial compressor has a compressor housing and, arranged therein, a compressor impeller which builds up a boost pressure.

The turbine impeller and the compressor impeller are arranged for conjoint rotation on the opposite ends of a common shaft, referred to as the rotor shaft, and thus form what is referred to as the turbocharger rotor. The rotor shaft extends axially between the turbine impeller and compressor impeller through the rotor bearing arranged between the exhaust-gas turbine and radial compressor. The rotor shaft is rotatably mounted in the rotor bearing in the radial and axial directions in relation to the rotor shaft axis. In this construction, the turbine impeller driven by the exhaust-gas mass flow drives the compressor impeller via the rotor shaft, thereby increasing the pressure in the intake tract of the internal combustion engine downstream of the radial compressor in relation to the air mass flow, and thereby ensuring better charging of the combustion chamber with atmospheric oxygen.

A so-called radial compressor is composed of four constituent parts: the compressor inlet, hereinafter also referred to as air supply channel, the compressor impeller, the diffuser and the compressor housing that has a spiral channel. By means of the rotational speed of the compressor impeller, air is drawn in axially through the air supply channel and is accelerated to high speeds in the compressor impeller. The air exits the compressor impeller in a radial or predominantly radial direction through the diffuser, is slowed in the diffuser, as a result of which pressure and temperature increase, and is collected and discharged via the spiral channel.

The operating behavior of a radial compressor is characterized by a so-called compressor characteristic map, which describes the pressure build-up versus the mass throughput for different compressor rotational speeds or circumferential speeds. A stable and usable characteristic map of the radial compressor is bounded by the so-called surge limit toward low throughputs, by the so-called choke limit toward higher throughputs, and by the maximum rotational speed limit in respect of structural mechanics.

In adapting a supercharging device, for example an exhaust-gas turbocharger, to an internal combustion engine, a radial compressor is selected which has a compressor characteristic map which is as expedient as possible for the internal combustion engine. The following preconditions should be satisfied here: an engine full-load curve should lie completely within the usable compressor characteristic map; minimum clearances with respect to the characteristic map limits, as required by the vehicle manufacturer, should be maintained; maximum compressor efficiencies should be available at the rated load and in a range of a low-end apex torque of the internal combustion engine; and the compressor impeller should have a minimum moment of inertia.

Simultaneously satisfying all the preconditions mentioned would be possible only to a limited extent with a conventional radial compressor without additional measures. For example, the following conflicting aims would arise from opposing trends: reduction in the moment of inertia of the compressor impeller and maximization of the characteristic map width and of the peak efficiency, reduction of scavenging in the region of the low-end apex torque and maximization of the specific rated power, improvement of the response behavior and increase in the specific rated power of the internal combustion engine.

The stated conflicting aims could be resolved by a compressor design which has a wide characteristic map with a minimum moment of inertia and maximum efficiencies on the full-load curve of the engine.

Apart from the steady-state requirements mentioned, stable operating behavior of the radial compressor must be ensured in transient operating states as well, for example in the case of a rapid load dump of the internal combustion engine. That is to say, the radial compressor must not enter the state of so-called surging even in the event of a sudden decrease of the conveyed air mass flow.

While being restricted to the compressor inlet or the air supply channel of a radial compressor, the abovementioned solution has hitherto been achieved by additional measures, such as an adjustable inlet guide vane assembly, measures for reducing an inlet cross section of the compressor inlet or a fixed recirculation channel, also referred to as a ported shroud or characteristic map-stabilizing measure. In the case of the variable solutions, the widening of the useful working range of the radial compressor is achieved by actively shifting the characteristic map. In this regard, during engine operation at low rotational speeds and correspondingly low throughputs of the radial compressor, the compressor characteristic map is shifted toward low air mass flows, whereas, during engine operation at high rotational speeds and correspondingly high throughputs of the radial compressor, the compressor characteristic map is not shifted or is shifted toward high air mass flows.

Through the setting of vane angles and the induction of a pre-swirl in or counter to the direction of rotation of the compressor impeller, the inlet guide vane assembly shifts the entire compressor characteristic map toward relatively low or relatively high throughputs. However, the adjusting mechanism of the inlet guide vane assembly constitutes a complicated solution.

The measures involving constriction of the compressor inlet, that is to say of the air supply channel, by cross section reduction shift the compressor characteristic map toward relatively low throughputs by virtue of the inlet cross section being reduced by closing the structure immediately upstream of the compressor impeller. In the open state, these measures open up the entire inlet cross section again as far as possible and hence do not or only marginally influence or shift the characteristic map. The usable compressor characteristic map is thus extended toward lower throughputs.

A fixed recirculation channel is a passive solution. It extends the useful characteristic map range of the compressor without fundamentally shifting the characteristic map thereof. It constitutes a significantly more expedient but at the same time less efficient solution in relation to the inlet guide vane assembly and the described variable cross section reduction.

To avoid compressor surge in the case of rapid load shedding, a "blowoff valve" is usually used, the valve opening a bypass from the compressor outlet to the compressor inlet in the case of a sudden decrease in the mass flow of boost air through the internal combustion engine and in this way keeping the radial compressor in the stable characteristic map range to the right of the surge limit. A combination of active measures, such as variable inlet guide vanes and the blowoff valve, is conceivable but unusual.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A radial compressor for a pressure-charging device of an internal combustion engine is disclosed. Further, a supercharging device having a radial compressor of the type for an internal combustion engine, and a lamella for an iris diaphragm mechanism of a radial compressor of the type, and methods for producing a lamella of the type are provided. The stated objects are intended to contribute to reliable operation of the radial compressor over an expanded characteristic map range with simultaneously reduced losses, whereby, at the same time, the power characteristics and the efficiency of an internal combustion engine equipped with a radial compressor of the type can be improved. Nevertheless, value should also be placed here on an inexpensive design.

A radial compressor for a supercharging device, for example for an exhaust-gas turbocharger, for an internal combustion engine is disclosed. The radial compressor has a compressor impeller which is arranged in a compressor housing and which is arranged rotationally conjointly on a rotatably mounted rotor shaft. Furthermore, an air supply channel is provided which connects to the compressor housing and which serves for conducting an air mass flow onto the compressor impeller. A spiral channel is arranged radially around the compressor impeller in the compressor housing for the purposes of discharging the compressed air mass flow.

An iris diaphragm mechanism is arranged in the air supply channel upstream of the compressor impeller in the air mass flow and is designed to at least partially close or open a diaphragm aperture, thus allowing variable adjustment of a flow cross section of the air supply channel for the air mass flow for admission to the compressor impeller, at least over a partial region of the flow cross section, in particular from fully opened to closed or constricted to a particular degree. For this purpose, the iris diaphragm mechanism has multiple lamellae which are mounted so as to be respectively rotatable about a center of rotation and which each have a plate style lamella main body and a pin style actuating element, which is designed for actuating the respective lamella, as integral constituent parts of the respective lamella.

The radial compressor provides a variable iris diaphragm mechanism, which is arranged in the air supply channel, in particular in the compressor inlet immediately upstream of the compressor impeller, for the purposes of shifting the characteristic map. The iris diaphragm mechanism may also be referred to as iris diaphragm or iris throttle and has the task of setting the air mass flow, flowing onto the compressor impeller, of the radial compressor. In this case, the iris throttle acts as a kind of mask for an outer region of the compressor inlet or of the air supply channel. As restriction increases, i.e. as the cross section is narrowed, the iris restrictor as it were takes on the function of a blowoff valve since it can prevent compressor surge of the radial compressor. This makes it possible to actively influence the operating range of the radial compressor and, in addition, to keep the radial compressor at a stable operating point in the case of a sudden load dump of the engine.

The air supply channel is arranged or formed on the compressor housing, surrounds the compressor inlet directly upstream of the compressor impeller, and extends upstream proceeding therefrom in relation to the air mass flow. For example, the air supply channel is at least partially constituted by the compressor housing and the iris diaphragm mechanism. An intake connector may also be part of the air supply channel.

The iris diaphragm mechanism has multiple lamellae which are mounted to be respectively rotatable about a center of rotation and displaceable relative to one another by rotation about the center of rotation. Each lamella is for example mounted, at its center of rotation, on a bearing ring which is mounted fixedly with respect to the housing in the air supply channel or at the compressor inlet, or is formed directly in the housing of the air supply channel or in the compressor housing that forms the air supply channel and/or the compressor inlet.

The housing of the iris diaphragm mechanism is for example a separate housing of the iris diaphragm mechanism, part of the compressor housing, or of single-part or multi-part form, for example by means of a part of the compressor housing and a separate, additional housing part. The housing is for example ring-shaped or has a ring-shaped portion. The housing may also be a fixed housing element.

The lamellae are synchronized and moved jointly by means of the adjusting ring. Rotation of the adjusting ring also triggers the rotation of the lamellae, as described above. In the event of a rotation of the lamellae about their axis of rotation, which in this exemplary embodiment are oriented parallel to the axis of rotation of the compressor impeller, the lamellae pivot radially inward from the fully opened position and thus lead to a desired constriction of the flow cross section directly upstream of the impeller. The adjusting ring itself is controlled and moved by means of actuator, for example. The actuator may be an electrically or pneumatically operated adjuster.

In the case of the radial compressor, provision is made whereby the lamellae are of single-piece form. In other words, at least the lamella main body and the bearing element and the actuating element are manufactured as a single piece, that is to say from one part. This contributes to a cost reduction in the production process, by contrast to lamellae which have separate actuating elements.

The supercharging device for an internal combustion engine, which supercharging device has a radial compressor as described above, is designed for example as an exhaust-gas turbocharger which has an exhaust-gas turbine for driving the compressor impeller of the radial compressor, or is alternatively designed as an electromotively operated supercharger (also referred to as an E-booster), which has an electromotive drive for driving the compressor impeller of the radial compressor.

As an alternative, the supercharging device may furthermore also be designed as a supercharger operated via a mechanical coupling to the internal combustion engine. Such a coupling between the internal combustion engine and the radial compressor may be accomplished by means of an intermediate gear mechanism, for example, which is operatively connected on one side to a rotating shaft of the internal combustion engine and on the other side to the rotor shaft of the radial compressor.

A lamella for an iris diaphragm mechanism as described by way of example above has a plate style lamella main body, which serves for the screening of the air mass flow and thus for the setting of the diaphragm aperture. For mounting on the housing or a bearing ring, a respective lamella has at least one bearing element for the rotatable mounting of the lamella. For example in a fastening portion in an end region of the lamella. In one embodiment, the bearing element is constituted by a bore in the plate style main body, by means of which said bearing element is rotatably mounted for example on a respective bearing pin fixed in the bearing ring. The respective lamella furthermore has an actuating element which is designed for actuating the respective lamella. The plate style main body, the bearing element and the actuating element are integral constituent parts of the respective lamella.

The lamella main body refers to the body which defines a lamella main surface for delimiting the diaphragm aperture. The lamella main body is of plate style form in a main extent plane and has, for example, an elongate curved main geometry in the form of a ring segment, wherein the lamella main body substantially has a closed encircling contour, that is to say an outer edge. The outer edge may be interrupted or have a projecting protuberance in the region of the actuating element.

In one embodiment, the actuating element of a respective lamella extends perpendicular or substantially perpendicular, that is to say with a predominantly perpendicular directional component, with respect to the above-stated main extent plane of the lamella main body. In other words, the actuating element projects from the lamella main body perpendicularly or in a predominantly perpendicular direction. The fastening portion with the bearing element may for example be formed in an end region, averted from or situated opposite the actuating element of the respective lamella.

The described lamella is for example produced from lamella semi-finished parts by means of a deformation process. For example, a lamella semi-finished part is punched out of a metal sheet and, in one subsequent or several of the subsequent processing steps, is correspondingly deformed such that the final lamella is formed in an integral construction.

In one embodiment of the radial compressor, the lamella main body of at least one lamella is formed from a metal sheet. The associated actuating element is manufactured by single or multiple bending of a protuberance provided for the purpose on the lamella main body. The actuating element extends substantially perpendicularly with respect to a main extent plane defined by the lamella main body. Single bending means a single deformation step. For example, a metal sheet portion of a lamella semi-finished part is bent through 90°. The metal sheet portion later forms the actuating element and is arranged on the lamella main body of the lamella semi-finished part, Multiple bendings means that multiple deformation steps are provided which bring the actuating element into its desired final shape.

In one embodiment of the radial compressor, the lamella main body of at least one lamella has an outer edge, wherein a protuberance of the lamella main body is formed which projects beyond the edge and from which the actuating element is shaped so as to be arranged substantially at the outer edge of the lamella main body. In other words, the actuating element extends, from an edge of the lamella main body, substantially perpendicular to the main extent plane of the lamella. The actuating element is in particular situated within the lamella main surface formed by the lamella main body. In other words, the actuating element blends into the lamella main body in an outward direction, wherein the actuating element terminates approximately flush with the outer edge. In this way, it is possible to realize a smaller minimum opening width of a diaphragm aperture of the iris diaphragm mechanism. This is because more free space for a movement of the lamellae is provided as a result of the position of the actuating element.

In a further embodiment of the radial compressor, the lamella main body of at least one lamella has an outer edge, wherein a protuberance is formed which projects beyond the edge and from which the actuating element is shaped so as to be arranged outside the lamella main body and spaced apart from the outer edge of the lamella main body. In this way, the above functions es with regard to the free space for a movement and the drive of the lamellae are further promoted.

The outer edge defines a main contour of the lamella main body, which is interrupted or extended only by the above-mentioned projecting protuberances. In other words, the outer edge is that which delimits the main shape of the lamella main body and thus the lamella main surface. Optionally incisions which can be made, which extend into the interior of the lamella main body and which delimit the projecting protuberance are not intended to be attributed to the outer edge.

In one embodiment that part of the actuating element which extends substantially perpendicular to the main extent plane of the lamella main body lies at the outer edge or outside the outer edge of the lamella main body.

In a further embodiment of the radial compressor, the protuberance provided on the lamella main body is formed and shaped such that the actuating element has the shape of a slotted cylinder which extends substantially perpendicular to a main extent plane defined by the lamella main body. The slotted cylinder can be produced for example by multiple bendings as described above. For example, two limbs or wings formed on the projecting protuberance are bent into a cylindrical shape, such that free ends of the limbs or wings face toward one another. In this way, the actuating element is provided with a rounded shape, which has the effect of reducing wear on the guide grooves of an adjusting ring. At the same time, this makes it possible for the actuating element to act as a radial spring, which permits a damping function. For example, an outer diameter of the slotted cylinder is adapted to a corresponding opening or groove of an adjusting ring for actuating the respective lamella, in such a way that the outer diameter is slightly larger than the width of the groove. In this way, the actuating element lies resiliently against the inner surfaces of the respective groove of the adjusting ring, whereby play in the actuating mechanism is avoided. In other words, an interference fit is predefined, whereby vibrations are dampened and, in particular, associated noise emissions are reduced.

In a further embodiment of the radial compressor, the lamella main body of at least one lamella is formed from a metal sheet, wherein the actuating element is formed from the lamella main body by deep drawing and extends substantially perpendicularly with respect to a main extent plane defined by the lamella main body. This constitutes a further alternative possibility for manufacturing the lamellae as a single piece with the actuating element. Similarly, use may alternatively also be made of further methods such as milling, sintering, casting or MIM ("Metal Injection Molding") to form a lamella as a single piece with an actuating element.

In one embodiment of the radial compressor a lamella has, in an end region of the lamella situated opposite the actuating element, a bearing element by means of which the lamella is mounted, so as to be rotatable about its center of rotation, on a bearing ring of the iris diaphragm mechanism.

One possible embodiment of the bearing element as mentioned above provides a bore by means of which the respective lamella is mounted on a bearing pin fixed in the bearing ring.

In a further embodiment of the radial compressor, as a bearing element, a pin element is provided on the respective lamella. The pin element is designed in the manner of an actuating element and extends substantially perpendicular to a main extent plane defined by the lamella main body in an opposite direction in relation to the actuating element. By means of which pin element the respective lamella is mounted, to be rotatable about its center of rotation, in a bore in the bearing ring. Both the actuating element and the bearing element can be produced in the same process.

In a further embodiment of the radial compressor, the iris diaphragm mechanism has a fixed bearing ring and an adjusting ring which is arranged concentrically with respect to the bearing ring and which is rotatable about a common center. Each lamella is mounted in each case so as to be rotatable about its center of rotation, on the bearing ring. For actuation of each lamella the adjusting ring has in each case one groove which runs obliquely in relation to the radial direction of the adjusting ring and into which the actuating element of the respective lamella engages and in which the actuating element is guided. By rotating the adjusting ring relative to the bearing ring, the obliquely running grooves cause the lamellae to be rotated about their center of rotation, and thus pivoted radially inward or outward, by means of the actuating elements. In this way, a robust mechanism with few individual parts is provided which requires little structural space and ensures reliable operation of the radial compressor.

A method for producing a lamella for an iris diaphragm mechanism of a radial compressor comprises the following steps: providing a plate style lamella semi-finished part composed of metal sheet, which has a lamella main body with an outer edge and a bearing element for the rotatable mounting of the lamella, wherein a protuberance is formed which projects beyond the edge; and bending the projecting protuberance relative to the lamella main body such that the protuberance then extends substantially perpendicular to a main extent plane defined by the lamella main body, and thus an actuating element is formed as an integral constituent part of the lamella.

The projecting protuberance, which is defined by an actuating element blank, and the lamella main body are part of the single-piece, plate style semi-finished part. The projecting protuberance projects for example from the lamella main body in the main extent plane of the main body and is subsequently singly or multiply bent. In the case of the bending, bending is performed for example through 90 degrees.

In a continuation of the above-stated method, a plate style lamella semi-finished part composed of metal sheet is provided, in the case of which the projecting protuberance has a central piece with two oppositely situated limbs projecting from the central piece. Here, the bending of the projecting protuberance relative to the lamella main body such that the protuberance then extends substantially perpendicular to a main extent plane defined by the lamella main body is followed by the bending of the projecting limb such that an actuating element with a slotted cylinder is formed as an integral constituent part of the lamella.

In this method, it is for example the case that firstly the central piece is bent through 90° relative to the lamella main body. Subsequently, the projecting limbs are bent radially relative to the central piece, such that the cylindrical portion of the actuating element is formed. The two bending steps may however also be performed in the reverse sequence.

A further method relates to the following steps: providing a plate style lamella semi-finished part composed of sheet metal which has a lamella main body; deep-drawing an actuating element from the lamella main body in such a way that an actuating element is formed as an integral constituent part of the lamella on the lamella main body, which actuating element extends substantially perpendicular to a main extent plane defined by the lamella main body.

The described methods for producing a lamella are suitable for producing large series.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The exemplary embodiments will be described below with the aid of the appended figures. Identical elements or elements of identical action are denoted by the same reference designations throughout the figures.

Figure 1:
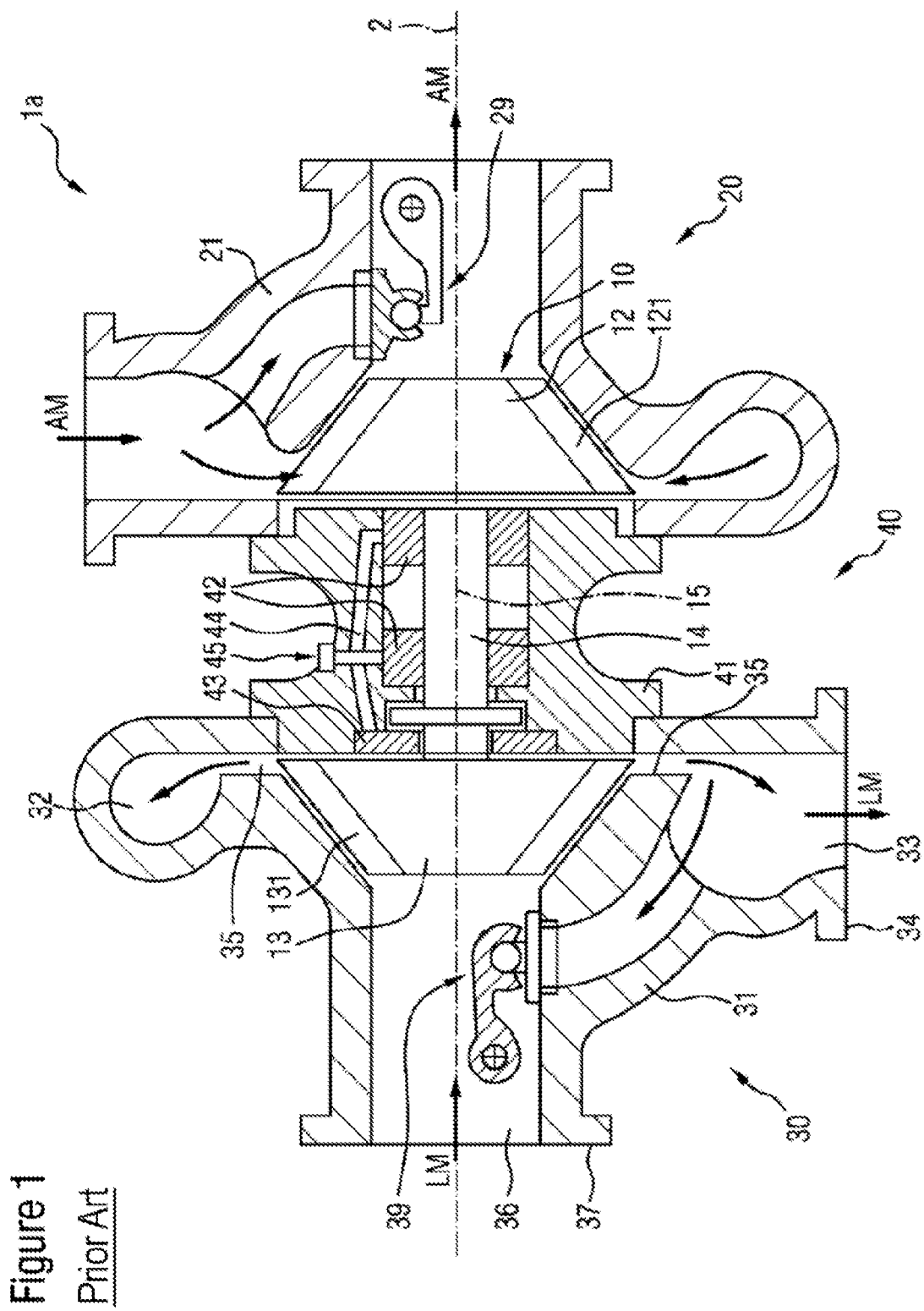
FIG. 1 shows a simplified schematic sectional view of a turbocharger according to prior art, as an example of a conventional supercharging device for an internal combustion engine.

FIG. 1 schematically shows a supercharging device for an internal combustion engine, based on the example of an exhaust-gas turbocharger 1a according to the conventional prior art, in a sectional illustration, which exhaust-gas turbocharger comprises an exhaust-gas turbine 20, a radial compressor 30 and a rotor bearing 40. The exhaust-gas turbine 20 is equipped with a wastegate valve 29 and an exhaust-gas mass flow AM is indicated by arrows. The radial compressor 30 has an overrun air recirculation valve 39 and an air mass flow LM is likewise indicated by arrows.

A so-called turbocharger rotor 10 of the exhaust-gas turbocharger 1a has a turbine impeller 12, a compressor impeller 13 and a rotor shaft 14 (also referred to simply as shaft). The turbocharger rotor 10 rotates about a rotor axis of rotation 15 of the rotor shaft 14 during operation. The rotor axis of rotation 15 and at the same time the turbocharger axis 2 (also referred to as longitudinal axis) are illustrated by the indicated centerline and identify the axial orientation of the exhaust-gas turbocharger. The turbocharger rotor 10 is supported with its rotor shaft 14 by means of two radial bearings 42 and one axial bearing disk 43. Both the radial bearings 42 and the axial bearing disk 43 are supplied with lubricant via oil supply channels 44 of an oil connection 45.

In general, a conventional exhaust-gas turbocharger 1a, as illustrated in FIG. 1, has a multi-part construction. Here, a turbine housing 21, which is arrangeable in the exhaust tract of the internal combustion engine, a compressor housing 31, which is arrangeable in the intake tract of the internal combustion engine, and a bearing housing 41 between the turbine housing 21 and compressor housing 31 are arranged adjacent to one another with respect to the common turbocharger axis 2 and are connected to one another in terms of assembly.

A further structural unit of the exhaust-gas turbocharger 1a is constituted by the turbocharger rotor 10, which has the rotor shaft 14, the turbine impeller 12, which is arranged in the turbine housing 21 and which has an impeller blade arrangement 121, and the compressor impeller 13, which is arranged in the compressor housing 31 and which has an impeller blade arrangement 131. The turbine impeller 12 and the compressor impeller 13 are arranged on the opposite ends of the common rotor shaft 14 and connected rotationally conjointly thereto. The rotor shaft 14 extends in the direction of the turbocharger axis 2 axially through the bearing housing 41 and is mounted in the axial and radial directions therein so as to be rotatable about its longitudinal axis, the rotor axis of rotation 15, wherein the rotor axis of rotation 15 lies on the turbocharger axis 2, that is to say coincides therewith.

The compressor housing 31 has an air supply channel 36, which has an intake pipe connector piece 37 for connection to the air intake system (not illustrated) of the internal combustion engine and which runs in the direction of the turbocharger axis 2 toward the axial end of the compressor impeller 13. Via this air supply channel 36, the air mass flow LM is drawn in from the air intake system by the compressor impeller 13. The air supply channel 36 may also be part of an intake connector and thus not part of the compressor housing 31.

Furthermore, the compressor housing 31 generally has a spiral channel 32 which is arranged in a ring around the turbocharger axis 2 and the compressor impeller 13 and which widens spirally away from the compressor impeller 13, and which is also referred to as a so-called fresh-air flute. The spiral channel 32 has a gap opening which runs at least over a part of the inner circumference and which has a defined gap width, the so-called diffuser 35, which, directed in a radial direction away from the outer circumference of the compressor impeller 13, runs into the spiral channel 32 and through which the air mass flow LM flows away from the compressor impeller 13 at elevated pressure into the spiral channel 32. The spiral channel 32 furthermore has a tangentially outwardly directed air discharge channel 33 with a manifold connector piece 34 for connection to an air manifold (not illustrated) of an internal combustion engine. Through the air discharge channel 33, the air mass flow LM is conducted at elevated pressure into the air manifold of the internal combustion engine.

Figure 2:
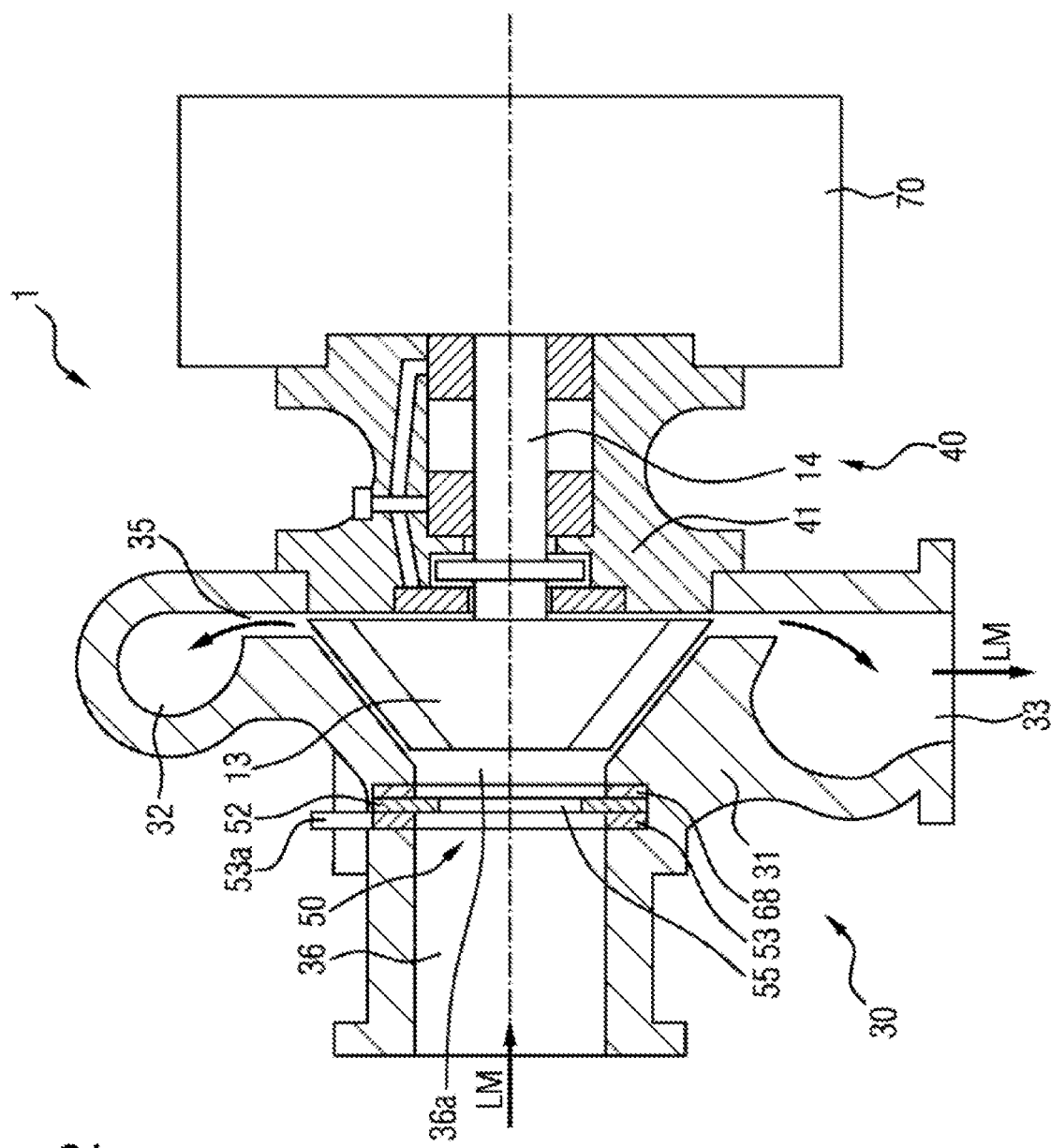
FIG. 2 shows a simplified schematic sectional view of a supercharging device with a radial compressor according to the invention.

FIG. 2 shows an embodiment of a supercharging device 1. The supercharging device 1 has an embodiment of a radial compressor 30, a rotor bearing and a drive unit 70. The radial compressor 30 has a compressor impeller 13 which is arranged in a compressor housing 31 and which is arranged rotationally conjointly on a rotor shaft 14 which is mounted rotatably in a bearing housing 41 of a rotor bearing 40.

Furthermore, the radial compressor 30 has an air supply channel 36 which adjoins the compressor housing 31 and which forms the compressor inlet 36a and which serves for conducting an air mass flow LM onto the compressor impeller 13, and a spiral channel 32 which is arranged radially around the compressor impeller 13 in the compressor housing 31. Here, the spiral channel 32 serves to receive and discharge the compressed air mass flow LM flowing away from the compressor impeller 13 and exiting through the diffuser 35. Here, the iris diaphragm mechanism 50 is fixed in the air supply channel 36 of the compressor housing 31 and/or forms a partial region of the air supply channel 36 directly upstream of the compressor inlet 36a of the compressor housing 31.

Upstream of the compressor impeller 13 in the air mass flow LM, the iris diaphragm mechanism 50 is, in addition to or as an alternative to an overrun air recirculation valve 39 (see FIG. 1), arranged in the air supply channel 36 immediately upstream of the compressor inlet 36a and forms a sub-region of the air supply channel 36 immediately upstream of the compressor inlet 36a of the compressor housing 31. The iris diaphragm mechanism 50 is designed to at least partially close or open a diaphragm aperture 55 such that a flow cross section for the air mass flow LM for admission into the compressor impeller 13 can be set variably at least over a partial region of the flow cross section.

The iris diaphragm mechanism 50 has a bearing ring 68 which is fixed in the air supply channel 36 concentrically with respect to the compressor inlet 36a, an adjusting ring 53 which is arranged concentrically with respect to the bearing ring and which is rotatable about a common center and which has an adjusting lever 53a, and multiple lamellae 52 which are mounted so as to be rotatable about a respective center of rotation in the bearing ring 68. The lamellae 52 have in each case one plate style lamella main body 56 and a pin style actuating element (not visible here), which is designed for actuating the respective lamella 52, as integral constituent parts of the respective lamella 52.

The drive unit 70 is not shown in any more detail in FIG. 2 and may be embodied either as an exhaust-gas turbine or as an electromotive drive unit, or else as a mechanical coupling to the internal combustion engine, for example as an intermediate gear mechanism which is operatively connected to a rotating shaft of the internal combustion engine, making the supercharging device 1 in one case into an exhaust-gas turbocharger 1a, and in the other case into an electromotively operated supercharger, also referred to as an E-booster or E-compressor, or into a mechanical supercharger.

Figure 3A:
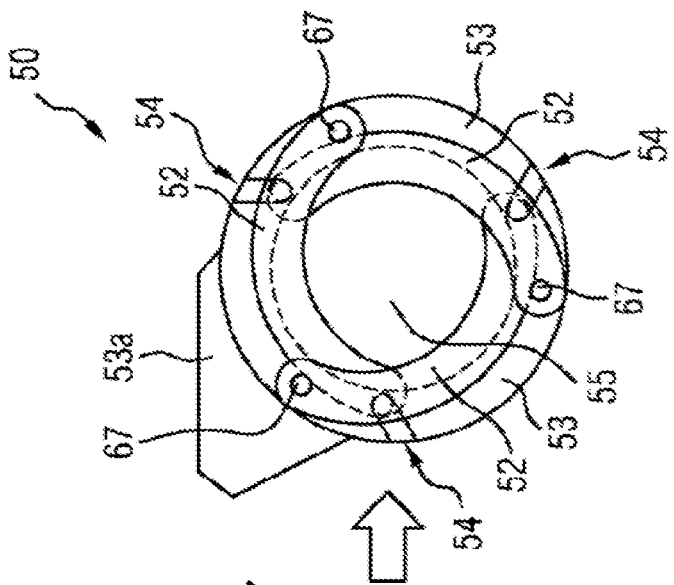
FIGS. 3a to 3c show schematic plan views of an iris diaphragm mechanism in three different operating states according to an exemplary embodiment.
Figure 3B:
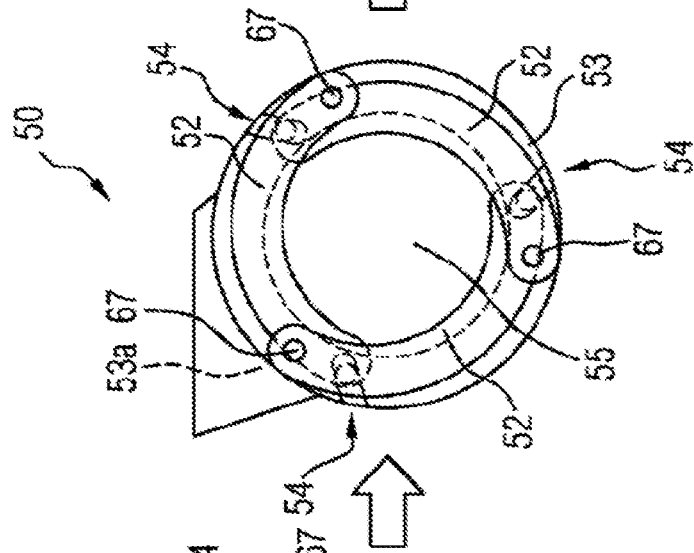
Figure 3C:
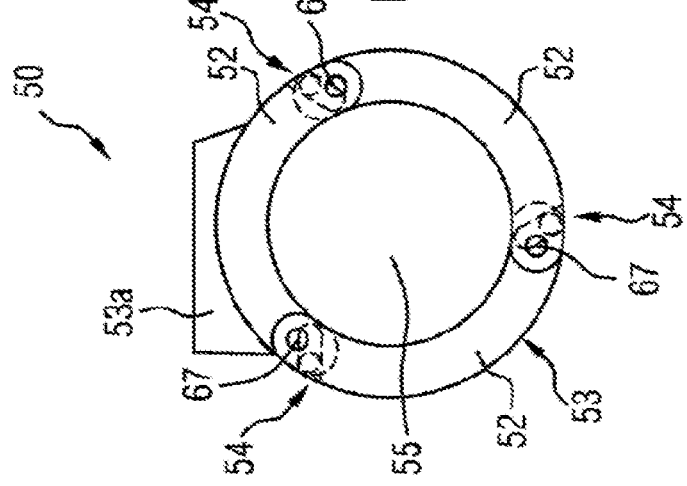
Figure 5A:
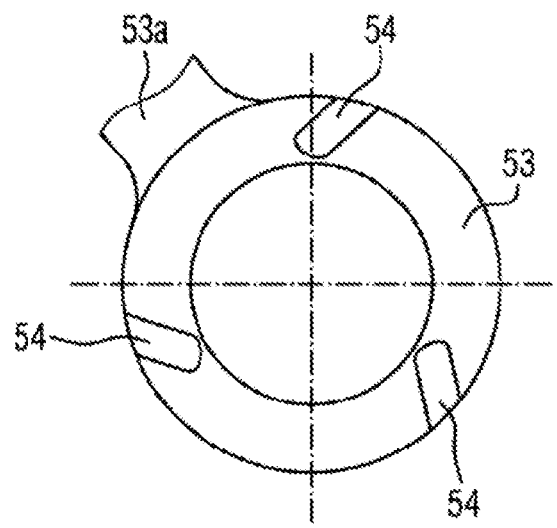
FIG. 5a shows a schematic plan view of an embodiment of an adjusting ring of the iris diaphragm mechanism.
Figure 5B:
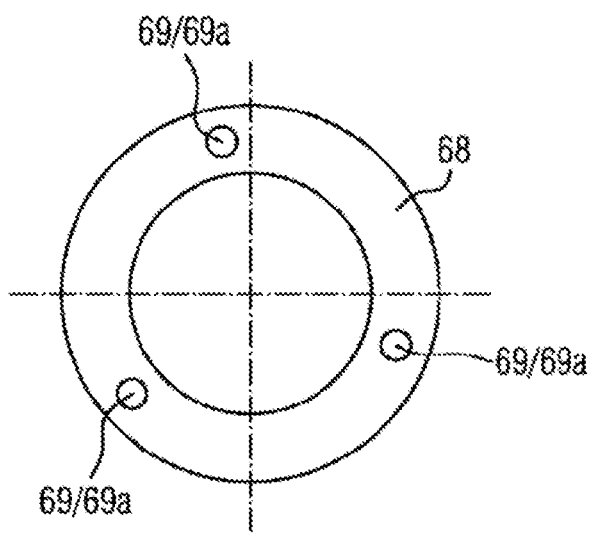
FIG. 5b shows a schematic plan view of an embodiment of a bearing ring of the iris diaphragm mechanism.

FIGS. 3a to 3c show schematically an embodiment of an iris diaphragm mechanism 50 for a radial compressor 30 according to the invention in three different operating states. The iris diaphragm mechanism 50 has a stationary, fixed (positionally fixed) bearing ring 68 (not illustrated). As illustrated in FIG. 5b, the bearing ring 68 may be formed by a separate component which is fixed in the surrounding housing, for example of the air supply channel 36. As an alternative, the bearing ring may also be formed directly in the surrounding housing and integrally with the latter. Thus, the bearing ring 68 may also be formed directly at the compressor inlet 36a of the compressor housing 31. As an alternative, it is also possible for a separate housing to be provided for the iris diaphragm mechanism 50, such that the iris diaphragm mechanism 50 can be mounted as a separate, pre-assembled functional unit on the compressor housing 31 or in the air supply channel 36.

In this example, three lamellae 52 are mounted on the bearing ring 68 so as to be rotatable about a respective bearing element 67. For this purpose, the bearing ring 68 has an associated rotary bearing location 69 for each lamella 52 (see FIG. 5b), at which bearing location the respective lamella 52 is rotatably mounted by means of its bearing element 67.

Each lamella 52 has an actuating element (not visible in FIGS. 3a, 3b and 3c) for actuation by an adjusting ring 53, wherein the bearing element 67 is arranged in an end region of the respective lamella 52 situated opposite the actuating element.

As a bearing element 67, it is for example possible for a bore to be provided in the respective lamella 52, by means of which bore the respective lamella 52 is mounted on a bearing pin 69a, visible in FIG. 5b, which is fixed in the bearing ring 68 and which forms the rotary bearing location.

The iris diaphragm mechanism 50 furthermore has an adjusting ring 53, which is arranged concentrically with respect to the bearing ring 68 and which can be rotated about the common center, the adjusting ring, in FIG. 3a, being largely concealed by the lamellae 52 and being visible only by its adjusting lever 53a. An embodiment of the adjusting ring 53 is illustrated separately in FIG. 5a.

In the example in FIGS. 3a to 3c and 5a, the adjusting ring 53 has three grooves 54 (only shown indicatively in FIGS. 3a to 3c) for guided actuation of the lamellae 52. In this case, for each lamella 52, there is provided in each case one groove 54 which extends obliquely in relation to the radial direction of the adjusting ring 53 and into which the actuating element of the respective lamella 52 engages and in which the actuating element is guided.

In this way, the lamellae 52 are moved in a synchronized manner by rotation of the adjusting ring 53. The adjusting ring 53 is mounted at its outer circumference, for example, on or in the housing of the iris diaphragm mechanism 50, or in a housing part formed for this purpose in the compressor housing 31 or the air supply channel 36.

By actuation of the adjusting ring 53, that is to say by rotation about the center shared with the bearing ring 68, the actuating elements of the lamellae 52 are guided radially inward by the obliquely extending grooves 54 and, in this way, the lamellae 52 are pivoted about the respective bearing location 67 likewise radially inward, and thus constrict a diaphragm aperture 55 of the iris diaphragm mechanism 50. Here, FIG. 3a shows the diaphragm aperture 55 with a maximum opening width, FIG. 3b shows the diaphragm aperture 55 with a reduced opening width, and FIG. 3c shows the diaphragm aperture 55 with a minimum opening width. These illustrations thus show the partial region of the flow cross section for this exemplary embodiment which can be adjusted variably by partial closure or opening of the iris diaphragm mechanism 50. The iris diaphragm mechanism 50 thus acts as a variable inlet throttle and, in this way, as mentioned at the outset, allows shifting of the characteristic map for the radial compressor 30.

Figure 9:
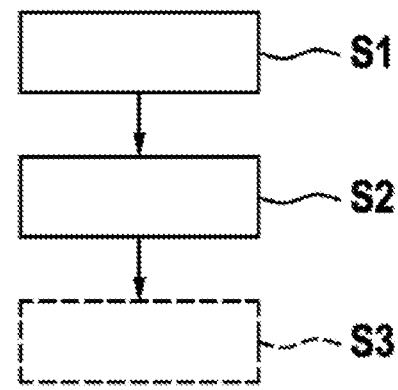
FIG. 9 shows a simplified schematic flow diagram of a method for producing a lamella.

Lamellae 52 of various exemplary embodiments will be described below with reference to FIGS. 4a, 4b, 6a to 6c and 7a to 7c, the production of which lamellae will be discussed on the basis of the flow diagram illustrated in FIG. 9.

Figure 4A:
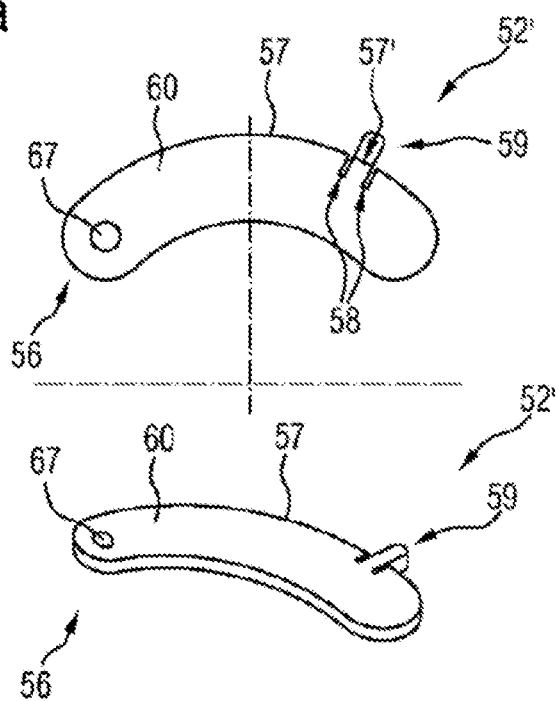
FIGS. 4a and 4b show a lamella of the iris diaphragm mechanism in different production states according to an exemplary embodiment, in each case in a plan view and a perspective view.
Figure 4B:
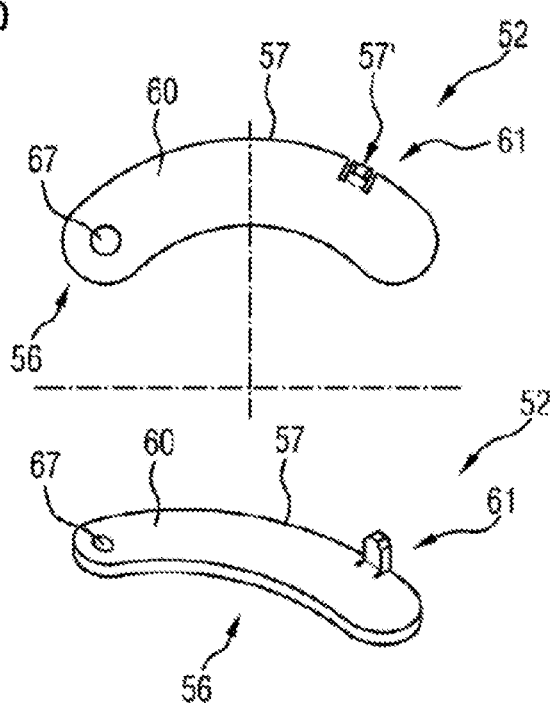

FIGS. 4a and 4b show a lamella 52 for the iris diaphragm mechanism 50 according to an exemplary embodiment, in each case in a plan view and perspective view, in two production states, wherein FIG. 4a illustrates a lamella semi-finished part 52', from which the final lamella 52 as illustrated in FIG. 4b is produced.

In a first step S1, the lamella semi-finished part 52' is provided. The lamella semi-finished part 52' is formed as a single piece, for example by virtue of the corresponding shape being punched out of a planar metal sheet.

The lamella semi-finished part 52' and the finished lamella 52 have a lamella main body 56. The lamella main body 56 is of plate style form and is delimited by an outer edge 57. The outer edge 57 represents an outer main contour of the lamella main body 56, which in this case is interrupted by two incisions 58. A projecting protuberance 59 is formed between the two incisions. The lamella main body 56 defines a lamella main surface 60 which—with the exception of the incisions 58—is formed by the outer edge 57 and an imaginary continuous connecting line 57' of the outer edge 57 in the region of the projecting protuberance 59 (see the dashed line in FIG. 4a). In other words, the main body defines a substantially closed shape which is defined by the main, outer edge 57 and which is theoretically closed in the region of interruptions such as the projecting protuberance 59. The projecting protuberance 59 initially lies in the same plane as the lamella main body 56, i.e. the main extent plane of the lamella main body, projects outward beyond the lamella main surface 60, and thus forms a projecting region 59. The projecting protuberance 59 represents an actuating element blank.

In a subsequent second step S2, the projecting protuberance 59 is then bent relative to the lamella main body 56 such that the projecting protuberance 59 projects at least predominantly in a normal direction of the lamella main body 56, i.e. substantially perpendicularly from the latter. A final, pin style actuating element 61 is thus formed. The above-stated incisions 58 serve here as cutaway portions in the deformation region of the actuating element 61, which ensure that, during the bending of the projecting protuberance 59, the outer edge 57 of the lamella 52 remains free from deformation.

As already mentioned, in the installed state of the iris diaphragm mechanism, the respective lamella 52 engages with its actuating element 61 into a groove, respectively provided for the purpose, in the adjusting ring 53, in order, when the adjusting ring 53 is correspondingly rotated, to pivot the respective lamella 52 about its center of rotation. Here, the center of rotation is formed by the respective associated rotary bearing location 69 in the bearing ring 68 or, for example, directly in the surrounding stationary housing of the iris diaphragm mechanism, on which the lamella 52 is rotatably mounted by means of a bearing element 67 formed on the lamella 52. The lamella 52 illustrated in FIGS. 4a and 4b has, for the rotational mounting, a bearing element 67, which in this exemplary embodiment is formed as a simple passage bore extending perpendicularly with respect to the main extent plane of the lamella main body 56 and is arranged in an end region of the lamella 52 situated opposite the actuating element 61. In this case, the rotary bearing location 69 is formed by a respective bearing pin 69a which is fixed in the bearing ring 68 (in this regard, see FIG. 5b) and on which the respective lamella 52 is fitted by way of its passage bore and is thus mounted.

As can be seen in particular in the plan view as per FIG. 4b, the actuating element 61 is arranged so as to terminate flush with the outer edge 57 of the lamella main body 56. In other words, the actuating element 61 does not project beyond the lamella main surface 60.

The lamella 52 makes it possible to realize the advantages and functions stated in the introduction. Owing to the positioning of the actuating element 61 at the edge of the lamella main body 56 and thus at the edge of the lamella 52, it is possible for the grooves 54 which are provided in the adjusting ring 53 and which serve for receiving the actuating element 61 to be kept closed in a radially inward direction, that is to say toward the center of the diaphragm aperture 55. This can be seen in detail in FIG. 5a, which shows an embodiment of the adjusting ring 53. The gap formed by the respective groove 54 thus remains closed toward the diaphragm aperture 55, whereby possible leakage by the iris diaphragm mechanism is kept low.

Figure 6A:
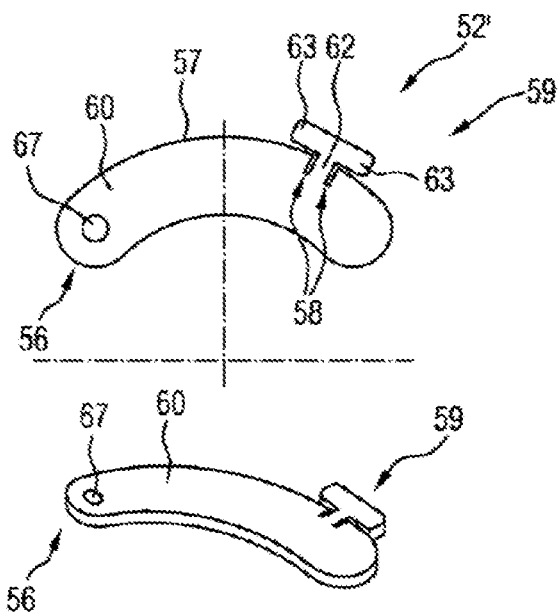
FIGS. 6a to 6c show a lamella of the iris diaphragm mechanism in different production states according to a further exemplary embodiment, in each case in a plan view and a perspective view.
Figure 6B:
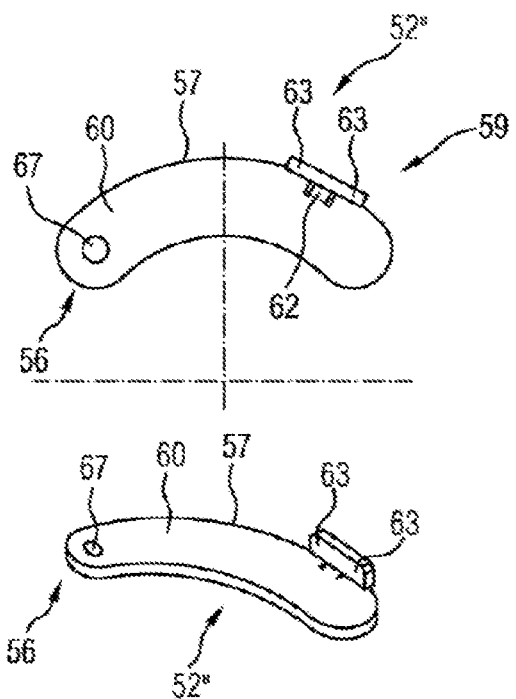
Figure 6C:
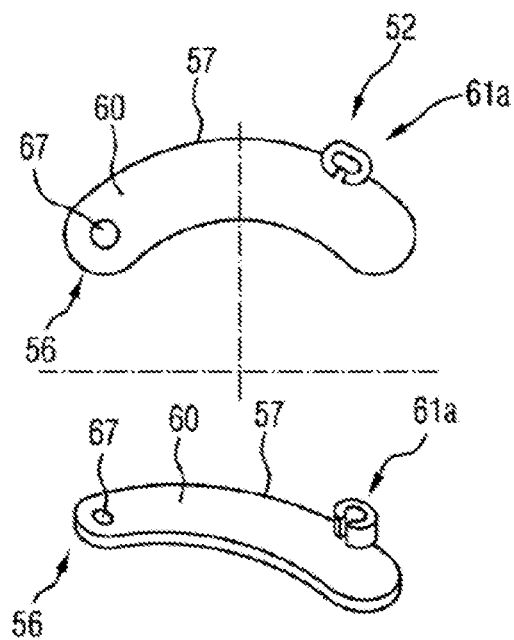

FIGS. 6a to 6c show the production of a lamella 52 according to a further exemplary embodiment in three steps S1 to S3 (see FIG. 9), in each case in a plan view and a perspective view, wherein the explanations above apply substantially analogously. Here, with regard to the projecting protuberance, in addition to the single bending described in FIGS. 4a and 4b, a further bending method step is implemented, the result of which is illustrated in FIG. 6c. FIG. 6a shows a first lamella semifinished part 52', which, analogously to that above, has a lamella main body 56 which has an outer edge 57 with two incisions 58. Formed between the incisions 58 is a projecting protuberance 59 which has a central piece 62, from which, by contrast to the embodiment mentioned above, two limbs 63 project to opposite sides. In a first method step S1, the blank is provided as above, which may be realized for example by punching out of a metal sheet in a punching process.

Subsequently, in a second step S2 (see FIG. 9), again analogously to the embodiment shown in FIGS. 4a, 4b, a 90° bend of the projecting protuberance 59 is implemented, wherein the central piece 62 of the projecting protuberance 59 is correspondingly bent. In this way, a second lamella semi-finished part 52" is formed.

Then, in a further method step S3 (as illustrated by dashed lines in the method diagram in FIG. 9), the two limbs 63 are bent such that an actuating element 61a in the form of a slotted cylinder is formed, as can be seen in FIG. 6c.

Analogously to the exemplary embodiment shown in FIGS. 4a, 4b, the actuating element 61a is, as per FIG. 6c, arranged and bent such that it in turn terminates flush with the outer edge 57 of the lamella main body 56, that is to say is arranged within the lamella main surface 60 and extends substantially perpendicular to the main extent plane defined by the lamella main body 56.

Figure 7A:
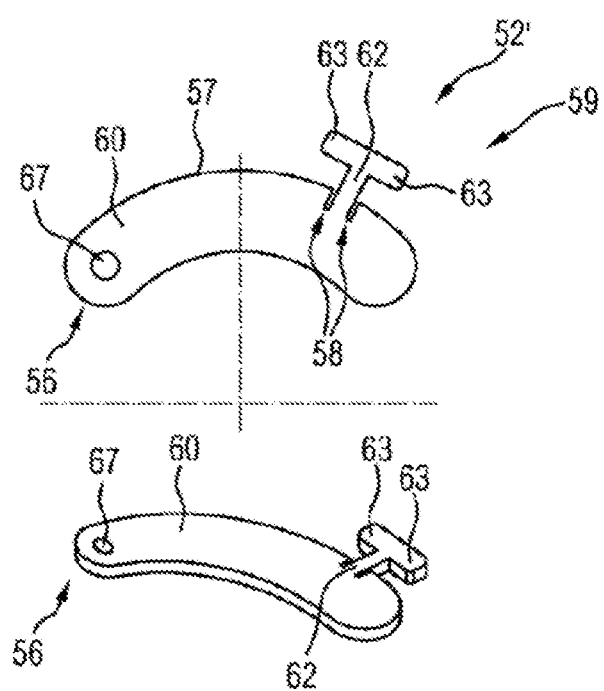
FIGS. 7a to 7c show a lamella of the iris diaphragm mechanism in different production states according to a further exemplary embodiment, in each case in a plan view and a perspective view.
Figure 7B:
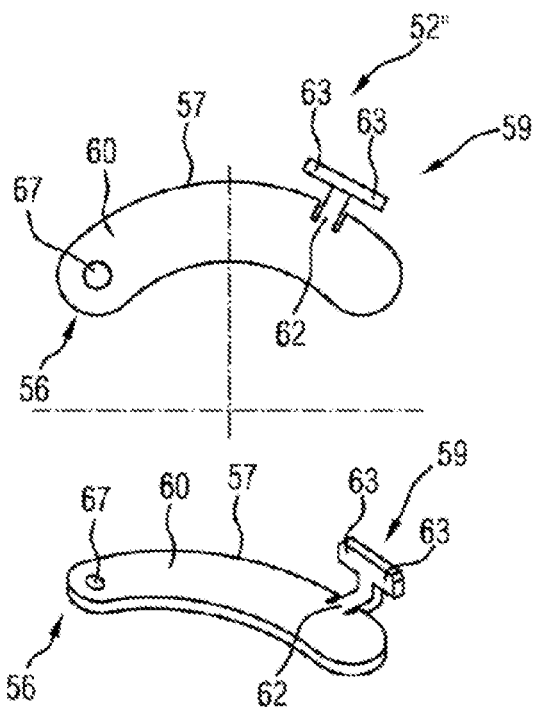
Figure 7C:
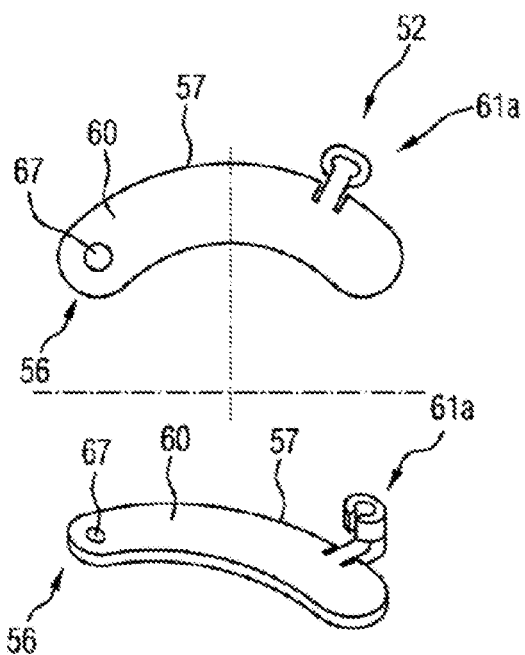

FIGS. 7a to 7c show a further embodiment of a lamella 52 in three production steps. This embodiment of the lamella 52 differs from the exemplary embodiments of the lamella 52 shown above in FIGS. 4a and 4b and 6a to 6c substantially in that the actuating element 61a, which corresponds to the abovementioned slotted cylinder, is arranged outside the lamella main body 56, that is to say outside the lamella main surface 60. In other words, the actuating element 61a is, in this embodiment, arranged spaced apart from the outer edge 57 and outside the lamella main body 56. For the arrangement of the actuating element outside the lamella main body 56, it is not necessary for the actuating element to have the shape of a slotted cylinder. A simple design of the actuating element 61 as shown in the exemplary embodiment of FIGS. 4a, 4b can also be arranged outside the lamella main body 56.

Figure 8A:
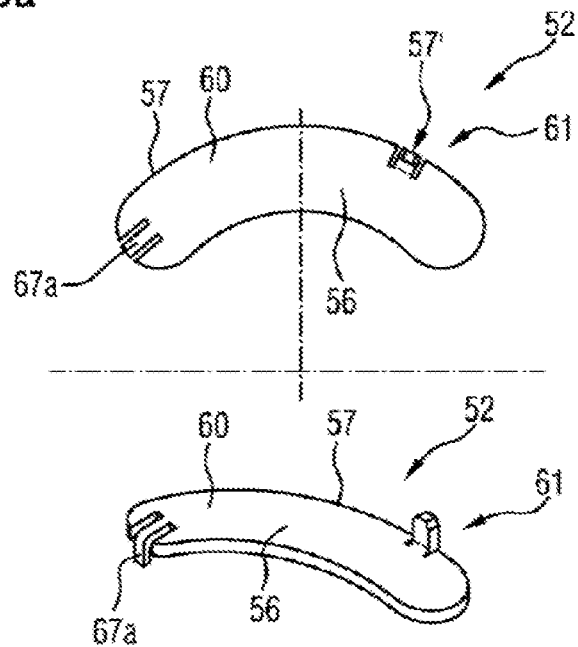
FIG. 8a shows a lamella of the iris diaphragm mechanism according to a further exemplary embodiment, in each case in a plan view and a perspective view.

FIG. 8a shows a further embodiment of a lamella 52 according to the invention in a plan view and a perspective view. This embodiment is distinguished by the fact that, as a bearing element, a pin element 67a is provided on the respective lamella 52, which pin element is designed in the manner of an actuating element 61, as illustrated for example in FIGS. 4a, 4b. Alternatively, it is self-evidently also possible for an embodiment of the bearing element 67a in the form of an actuating element 61a according to the embodiments of FIGS. 6a to 6c or 7a to 7c to be provided. The bearing element 67a extends substantially perpendicularly with respect to a main extent plane defined by the lamella main body 56, in an opposite direction in relation to the actuating element 61. By means of the corresponding bearing element 67a, the respective lamella 52 is mounted rotatably about its center of rotation in a rotary bearing location 69, wherein the rotary bearing location 69 may be designed for example as a simple bore in the bearing ring 68. Here, the bearing ring 68 may be designed as a separate component or may also be formed directly in the surrounding housing.

Figure 8B:
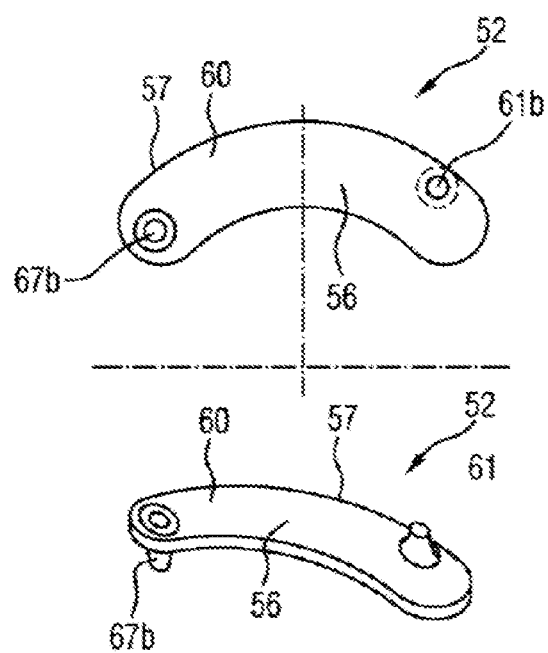
FIG. 8b shows a further embodiment of a lamella of the iris diaphragm mechanism, in each case in a plan view and a perspective view.

FIG. 8b shows a further embodiment of a lamella 52 according to the invention in a plan view and a perspective view. In this embodiment of the lamella 52, the lamella main body 56 is formed from a metal sheet, wherein the actuating element 61b is formed from the lamella main body 56 by deep drawing and extends substantially perpendicularly with respect to a main extent plane defined by the lamella main body 56. Furthermore, the illustrated lamella 52 has a bearing element 67b which, like the actuating element 61b, is also formed from the lamella main body 56 by deep drawing. Thus, this embodiment of the lamella 52 with the actuating element 61b and the bearing element 67b is also formed as a single piece and makes it possible to realize the advantages and functions stated in the introduction.

It is furthermore pointed out that, in a respective lamella 52, it is also possible to select a combination of actuating element 61, 61a, 61b and bearing element 67, 67a, 67b of the above embodiments which is not explicitly illustrated in the figures. For example, in a lamella 52, a deep-drawn bearing element 67b may be combined with an actuating element 61a in the form of a slotted cylinder.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for producing a lamella comprising:
providing a plate style lamella semi-finished part composed of sheet metal, which has a lamella main body with an outer edge and a bearing element for the rotatable mounting of the lamella, wherein a protuberance is formed which projects beyond the edge; and
bending the projecting protuberance relative to the lamella main body such that the protuberance extends perpendicular to a main extent plane defined by the lamella main body, and thus an actuating element is formed as an integral constituent part of the lamella.

2. The method for producing a lamella as claimed in claim 1, wherein the protuberance projecting beyond the edge has a central piece with two oppositely situated limbs projecting from the central piece, and
wherein the bending of the projecting protuberance relative to the lamella main body such that the protuberance extends perpendicular to a main extent plane defined by the lamella main body is followed by the bending of the projecting limb such that an actuating element in the form of a slotted cylinder is formed as an integral constituent part of the lamella.

3. A lamella for an iris diaphragm mechanism of a radial compressor, wherein the lamella has a plate style lamella main body, a bearing element for the rotatable mounting of the lamella, and a pin style actuating element for actuating the respective lamella, the main body and the actuating element are integral parts of the lamella,
wherein the actuating element of the lamella is formed from a protuberance on the lamella main body to extend perpendicularly with respect to a main extent plane defined by the lamella main body, and
wherein the lamella main body is formed from sheet metal, and the actuating element is manufactured by bending of the protuberance.

4. A radial compressor for a supercharging device of an internal combustion engine comprising:
a rotor shaft rotatably mounted in a bearing assembly;
a compressor impeller arranged in a compressor housing for conjoint rotation on the rotor shaft;
an air supply channel for carrying an air mass flow to the compressor impeller;
an iris diaphragm mechanism to at least partially close and open a diaphragm aperture allowing variable adjustment of a flow cross section for the air mass flow for admission to the compressor impeller, at least over a partial region of the cross section; and
a plurality of lamellae respectively rotatable about a center of rotation and each having a lamella main body and an actuating element for actuating the respective lamella, wherein the main body and the actuating element are integral to the respective lamella,
wherein the actuating element of at least one lamella is formed from a protuberance on the lamella main body to extend perpendicularly with respect to a main extent plane defined by the lamella main body, and
wherein the lamella main body is formed from sheet metal, and the actuating element is manufactured by bending of the protuberance.

5. The radial compressor as claimed in claim 4, wherein the protuberance is formed to project beyond an outer edge of the lamella main body such that the actuating element is arranged at the outer edge of the lamella main body.

6. The radial compressor as claimed in claim 4, wherein the protuberance is formed to project beyond an outer edge of the lamella main body such that the actuating element is arranged outside the lamella main body and spaced apart from the outer edge of the lamella main body.

7. The radial compressor as claimed in claim 4, wherein the projecting protuberance body is formed such that the actuating element has a shape of a slotted cylinder which extends perpendicular to the main extent plane.

8. The radial compressor as claimed in claim 4, wherein the actuating element is formed from the lamella main body by deep drawing sheet metal.

9. The radial compressor as claimed in claim 4, further comprising a bearing element in an end region of the lamella situated opposite the actuating element, wherein the lamella is rotatably mounted to a bearing ring of the iris diaphragm mechanism with the bearing element.

10. The radial compressor as claimed in claim 9, wherein the bearing element is a bore mountable on a bearing pin fixed in the bearing ring.

11. The radial compressor as claimed in claim 9, wherein the bearing element is a pin element that extends perpendicular to a main extent plane defined by the lamella main body in an opposite direction in relation to the actuating element and mountable on a bore defined by the bearing ring.

12. The radial compressor as claimed in claim 4, wherein the iris diaphragm mechanism has a fixed bearing ring and an adjusting ring arranged concentrically thereto and rotatable about a common axis, wherein each lamella is mounted rotatably about its center on the bearing ring.

13. The radial compressor as claimed in claim 12, further comprising a groove defined by the adjusting ring and corresponding to each lamella, wherein the groove runs obliquely in relation to the radial direction of the adjusting ring such that the actuating element of the respective lamella is guided for actuation.

14. The radial compressor as claimed in claim 4, wherein the actuating element is a pin style actuating element.

15. The radial compressor as claimed in claim 4, wherein the radial compressor is located in a supercharging device which is one of: an exhaust-gas turbocharger, a supercharger operated by electric motor, and as a supercharger operated via a mechanical coupling to the internal combustion engine.

* * * * *